April 18, 1950     J. C. HAEFELI     2,504,409

CHANGE SPEED GEAR OF MOTOR VEHICLES

Filed Dec. 23, 1944

Julius Charles Haefeli
INVENTOR.

By Lester Sargent
Attorney.

Patented Apr. 18, 1950

2,504,409

UNITED STATES PATENT OFFICE 2,504,409

CHANGE-SPEED GEAR OF MOTOR VEHICLES

Julius Charles Haefeli, Birmingham, England, assignor to The Austin Motor Company Limited, Northfield, Birmingham, England Application December 23, 1944, Serial No. 569,517
In Great Britain December 24, 1943

1 Claim. (Cl. 192—53)

The invention relates to change-speed gear of motor vehicles and of the type known as synchromesh gear. Such gear may involve the sliding of one gear wheel into mesh with another, but it is usually of the constant-mesh type, each speed change being effected by sliding a dog clutch member into engagement with another dog clutch member; but, to prevent clashing of the dogs or wheels, the two respective clutch members or wheels are first caused to run at approximately the same speed by the engagement of a friction clutch which consists usually of an outer member internally coned and an inner member externally coned, the coned members consisting of different material. To increase the frictional hold friction material with asbestos base, similar to the kind of material used for clutches and brake linings, has been considered; but such lining requires to be cemented on to the cones by a special method usually only available to the friction material manufacturer so that renewal can only be effected thereby.

The present invention has for its object to provide a form of friction device applied to the inner or outer cone, and such that it can be readily applied and easily replaced.

According to the preferred form of this invention holes are formed, through the inner cone and disposed radially or normal to the cone surface; and into these holes are driven pegs or studs of fabric or other friction material. As the inner cone is usually driven on to splines of the respective gear shaft or wheel, the holes in the inner cone are formed right through from the outer to the inner surface of such member, so that the pins or studs, as they are being put in place, can be driven down on to the said splines, and these, by becoming embedded in the inner ends of the studs, prevent the studs from turning.

The length of each stud is such that, when it is driven in, it projects slightly above the cone surface. When all the studs are in place, their outer ends are shaped to conform to an imaginary cone slightly outwards of the said inner cone surface.

In lieu of placing the pegs or studs in holes formed in the inner cone, they may be fitted into radial or normally directed holes formed in the outer cone, but such arrangement is not preferred.

A convenient embodiment of the invention is described with reference to the accompanying drawings, of which:

Figure 1:
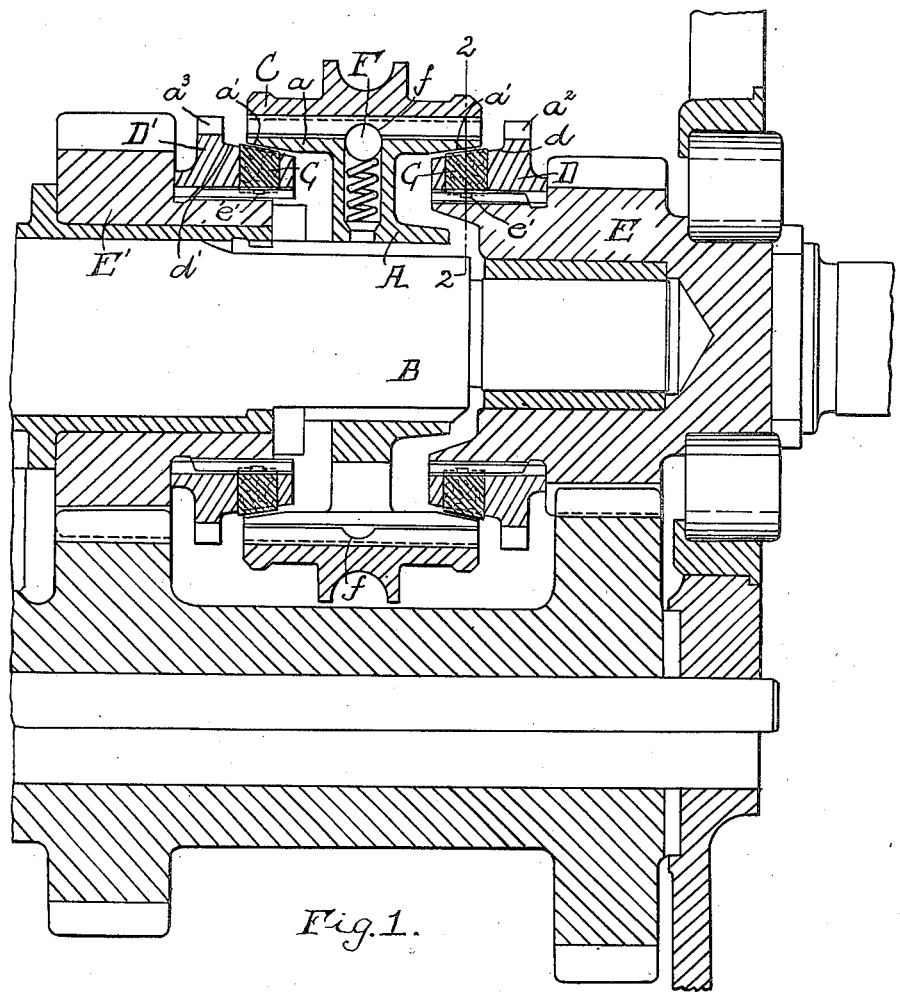
Figure 1 is a sectional plan view of a portion of a synchromesh change-speed gear to which means according to the invention are applied; and, Figure 2 is a fragmentary sectional view, the section being taken in the plane indicated by the line 2, 2, of Figure 1; but only a quadrant of the parts is shown.
Figure 2:
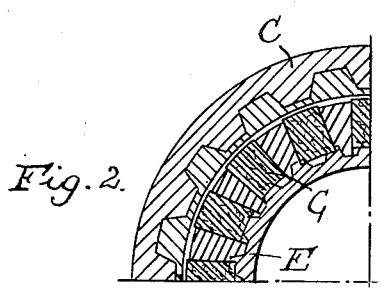

Referring first to Figures 1 and 2, A indicates the usual sliding disc or driving member splined on the driven shaft B and having integral with it a hollow cylindrical portion $a$ which has the usual external longitudinal splines formed on its outer periphery with which splines engage internal longitudinal splines of the usual sliding coupling sleeve C. The two ends of the cylindrical portion $a$ have internal coned surfaces $a'$. Clutch rings D, D', splined on the first motion shaft E and third speed wheel E', respectively, have externally coned surfaces $d, d'$.

When the sleeve C is moved endwise it, at first, carries the disc A with it owing to the engagement of a spring-pressed ball F with an annular groove $f$ cut in the internal splines of the sliding sleeve C. This causes engagement, in a known manner, of one of the cone surfaces $a'$ with one of the rings D or D' as the case may be. Further movement of the sleeve C in the same direction forces the ball out of the groove; and the internal splines of the sleeve then engage with dog teeth $a^2$ or $a^3$ of the ring D or D' as the case may be.

Radially disposed pegs G of fabric or other friction material are driven into radial holes formed right through each of the rings D, D', such pegs being caused to bear at their inner ends against the splines with which the rings D, D', engage; and, as the splines bite to some extent into the material of the pegs, the pegs are kept from turning. The pegs also enter, to some extent, into annular grooves $e'$ cut in the splines integral with the wheels E and E', thus preventing longitudinal movement of the rings D, D'.

When the pegs G are first set in the holes in the rings they are arranged to project a short distance above the cone surface of the ring, and they are afterwards machined until their outer ends form parts of the surface of an imaginary cone, and they are adapted to engage the respective internal cone surfaces $a'$.

It will be seen that any wear which takes place due to slip will come almost entirely on the pegs which can be easily replaced.

Figure 3:
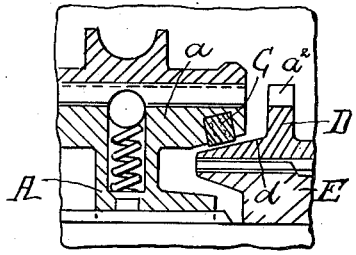
Figure 3 is a fragmentary sectional plan view illustrating a modification.

Referring to Figure 3, the pegs G, instead of being inserted in holes in the inner, or externally coned, surface, are inserted in holes formed in the cylindrical portion $a$ where the outer or internally coned surface is formed. In this view the holes are shown as formed normal to the cone surface.

Having fully described my invention what I claim and desire to secure by Letters Patent is:

A synchromesh gear comprising driven members, driving members slidable into positive engagement with driven members, said driving members comprising pairs of cone clutch members adapted to be first engaged to bring said driving and driven members to approximately the same speed before they are interengaged, one of each pair of cone clutch members having holes formed in the coned surface, and pegs of fabric driven into said holes and having an end of each peg projecting above the said cone surface, said ends of the pegs being machined to cause them to form parts of an imaginary cone situated a small distance away from the surface in which the said holes are formed, an annular member, longitudinal splines on the outer periphery of said annular member, internal splines of said inner cone clutch member in rigid engagement with said splines of said annular member, said holes formed through said inner clutch member and said pegs in said holes driven down on to said splines of said annular member.

JULIUS CHARLES HAEFELI.

REFERENCES CITED

The following references are of record in the file of this patent:

UNITED STATES PATENTS

| Number | Name | Date |
|---|---|---|
| 907,051 | Hook | Dec. 15, 1908 |
| 1,182,431 | Slade | May 9, 1916 |
| 1,531,510 | Ryan | Mar. 31, 1925 |
| 1,655,827 | Stanley | Jan. 10, 1928 |
| 1,923,385 | Murray | Aug. 22, 1933 |
| 2,085,019 | Griswold | June 29, 1937 |
| 2,097,856 | Fawick | Nov. 2, 1937 |
| 2,101,134 | Fawick | Dec. 7, 1937 |

FOREIGN PATENTS

| Number | Country | Date |
|---|---|---|
| 24,014 of 1935 | Australia | June 25, 1936 |